(12) United States Patent
Kanehara et al.

(10) Patent No.: US 11,066,076 B2
(45) Date of Patent: Jul. 20, 2021

(54) AUTONOMOUS DRIVING SYSTEM, AUTONOMOUS MOBILE OBJECT, AND SERVER

(71) Applicant: Toyota Jidosha Kabushiki Kaisha, Toyota (JP)

(72) Inventors: Isao Kanehara, Miyoshi (JP); Kazuhiro Umeda, Nisshin (JP); Hideo Hasegawa, Nagoya (JP); Tsuyoshi Okada, Toyota (JP); Shinjiro Nagasaki, Tokyo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 102 days.

(21) Appl. No.: 16/225,778

(22) Filed: Dec. 19, 2018

(65) Prior Publication Data

US 2019/0193742 A1 Jun. 27, 2019

(30) Foreign Application Priority Data

Dec. 25, 2017 (JP) .............................. JP2017-247840

(51) Int. Cl.
 *B60W 40/08* (2012.01)
 *G06K 9/00* (2006.01)
 *G05D 1/00* (2006.01)

(52) U.S. Cl.
 CPC ........... *B60W 40/08* (2013.01); *G05D 1/0088* (2013.01); *G06K 9/00845* (2013.01);
 (Continued)

(58) Field of Classification Search
 CPC ......... B60W 40/08; B60W 2040/0818; B60W 2040/0872; G05D 1/0088; G06K 9/00845; G08D 2201/0213
 (Continued)

(56) References Cited

U.S. PATENT DOCUMENTS

2012/0029697 A1* 2/2012 Ota ..................... B66F 9/063
 700/253
2014/0058755 A1* 2/2014 Macoviak ............. G06Q 10/10
 705/3

(Continued)

FOREIGN PATENT DOCUMENTS

CN 105448055 A 3/2016
JP 2015-092320 A 5/2015

OTHER PUBLICATIONS

Qi, Huang; "Black technology! Self-driving clinics and pharmacies allow patients to skip hospital queues", CN-Healthcare, Accessed Apr. 7, 2021, URL: https://www.cn-healthcare.com/article/20171111/content-497147.html.

(Continued)

*Primary Examiner* — Jack K Wang
(74) *Attorney, Agent, or Firm* — Dinsmore & Shohl LLP

(57) ABSTRACT

The system includes an examination controller that performs control relating to medical examination of a client user in the mobile object, a controller configured to, decide whether or not to transport the client user to a medical facility, and create an operation command so as to cause the mobile object to pick up the client user at a first destination, which is a location based on information sent from a client user's terminal used by the client user, and when the controller decides to transport the client user to the medical facility after the mobile object moves to the first destination, to transport the client user aboard the mobile object to the medical facility as a second destination.

8 Claims, 9 Drawing Sheets

(52) U.S. Cl.
CPC ............... *B60W 2040/0818* (2013.01); *B60W 2040/0872* (2013.01); *G05D 2201/0213* (2013.01)

(58) Field of Classification Search
USPC ......................................................... 340/576
See application file for complete search history.

(56) References Cited

U.S. PATENT DOCUMENTS

| | | | |
|---|---|---|---|
| 2017/0024537 A1* | 1/2017 | Ferlito | H04L 67/025 |
| 2017/0069214 A1* | 3/2017 | Dupray | G08G 5/0013 |
| 2017/0281441 A1* | 10/2017 | Fich | A61G 7/08 |
| 2017/0367662 A1* | 12/2017 | Boyer | A61B 5/14542 |
| 2018/0089377 A1* | 3/2018 | Cardonha | G16H 40/20 |
| 2019/0043606 A1* | 2/2019 | Roots | G16H 40/20 |

OTHER PUBLICATIONS

"Concept action clinic, a collection of artificial intelligence self-driving technology", aihot, Jul. 1, 2017, URL: https://www.aihot.net/other/medicine/3650.html.

* cited by examiner

AUTONOMOUS DRIVING SYSTEM, AUTONOMOUS MOBILE OBJECT, AND SERVER

CROSS REFERENCE TO RELATED APPLICATION

This application claims priority to Japanese Patent Application No. 2017-247840 filed on Dec. 25, 2017, which is hereby incorporated by reference herein in its entirety.

BACKGROUND

Technical Field

The present disclosure relates to an autonomous driving system, autonomous mobile object, and a server.

Description of the Related Art

There have been developed autonomous vehicles that can run autonomously without driving operations by a human driver. For example, Patent Literature 1 discloses a plurality of autonomous vehicles configured to patrol along predetermined routes to prevent crimes.

CITATION LIST

Patent Literature

Patent Literature 1: Japanese Patent Application Laid-Open No. 2015-092320

SUMMARY

The autonomous vehicle described in Patent Literature 1 can transport a user to a destination. The destination is determined in advance by the user. For example, if the destination is a medical facility, the autonomous vehicle transports the user to the medical facility as the destination, and after the arrival at the destination, the user gets off the autonomous vehicle to receive a medical examination or treatment at the medical facility. In this case, the autonomous vehicle merely transports the user. In this connection, there may be cases where the condition of the user is not so serious that he or she does not need to go to a medical facility. If the user who does not need to go to a medical facility is prevented from going to it, the busyness of the medical facility can be reduced. There may also be cases where the condition of the user is so serious that treatment in a medical facility is needed. If the user himself or herself determines whether or not to go to a medical facility on the basis of self-diagnosis, there is a possibility that the user may inappropriately decide not to go to a medical facility though he or she actually needs medical treatment.

The present disclosure has been made in view of the above circumstances, and an object of the present disclosure is to enable medical examination and transportation of users using a mobile object.

According to one aspect of the present disclosure, there is provided an autonomous driving system including a mobile object that moves autonomously on the basis of an operation command. The autonomous driving system comprises an examination controller configured to perform control relating to a medical examination of a client user in said mobile object, and a controller configured to: create said operation command, and decide whether or not to transport said client user to a medical facility on the basis of a result of the medical examination of said client user. Said controller is further configured to create said operation command so as to cause said mobile object to pick up said client user at a first destination, which is a location based on information sent from a client user's terminal used by said client user, and when said controller decides to transport said client user to said medical facility after said mobile object moves to said first destination, to transport said client user aboard the mobile object to said medical facility as a second destination.

The client user is a user who makes a request for medical examination or transportation by a mobile object. Until the mobile object receives an operation command that orders it to pick up the client user at the first destination, the mobile object may run along a predetermined route, be on standby at a certain place, or be employed for a certain purpose. In response to a request made by the client user, the controller creates an operation command so as to cause the mobile object to move to a location based on information sent from the client user's terminal used by the client user (or the first destination) and to pick up the client user at the first destination. The location based on information sent from the client user's terminal is, for example, the current location of the client user's terminal acquired by the client user's terminal or a location input to client user's terminal by the client user. The mobile object moves to the first destination according to this operation command. The mobile object has an interior space that can accommodate the client user, and the client user can get on the mobile object arriving at the first destination. After the client user gets on the mobile object, control relating to medical examination of the client user is performed in the mobile object. The examination controller may perform the control of automatically examining the client user using sensors or the like, asking questions prepared in advance of the client user, and/or establishing communication that enables medical examination of the client user by an examiner user. The examiner user is a user who conducts a medical examination of the client user. When the examiner user examines the client user, the examiner user may be at a place remote from the mobile object and examine the client user by telemedicine through communication between a terminal used by the client user and a terminal used by the client user. The controller decides whether or not to transport the client user to a medical facility on the basis of a result of this medical examination. In the case where the controller decides to transport the client user to a medical facility, an operation command is created by the controller so as to cause the mobile object to transport the client user aboard the mobile object to a medical facility (or the second destination). After receiving the operation command, the mobile object moves to the medical facility with the client user aboard. Thus, the mobile object can transport the client user to the medical facility. As above, the system can provide medical examination and transportation using the mobile object. Even in the case where it is not necessary to transport the client user to a medical facility, the client user can receive a medical examination in the mobile object.

The system may further comprise an examiner user's terminal used by the examiner user who conducts a medical examination of said client user and communicating with said client user's terminal, and said examiner user's terminal may create the result of the medical examination of said client user.

With this arrangement, the examiner user can interview the client user through the examiner user's terminal and the client user's terminal. This can improve the accuracy of the medical examination. Since the examiner user examines client user by telemedicine from a place remote from the mobile object, it is not necessary for the examiner user to move to the place at which the client user is located.

Said examination controller may create the result of the medical examination of said client user in said mobile object.

The examination controller may be configured to examine the client user by outputting questions prepared in advance to the client user and receiving answers to the questions input by the client user. The examination controller may be configured to examine the client user by scanning the client user, measuring the pulse and/or the blood pressure of the client user, and/or examining a specimen of the client user. In this way, the client user can be examined automatically, and the controller can decide whether or not to transport the client user to a medical facility on the basis of the result of the examination.

In cases where there are a plurality of medical facilities, said controller may select a medical facility as said second destination according to the result of the medical examination of said client user.

Medical facilities that can treat the client user may vary depending on the condition of the client user. Therefore, if the medical facility by which the client user is to be treated is selected according to the result of the examination, the client user can receive more appropriate treatment.

In cases where there are a plurality of medical facilities, said controller may select a medical facility as said second destination taking account of waiting time taken until said client user receives treatment.

Specifically, for example, the controller may select as the second destination the medical facility with the shortest waiting time or arbitrarily select a medical facility among the medical facilities of which the waiting time falls within an allowable range. Alternatively, the controller may select as the second destination the medical facility of which the sum of the time taken for the mobile object to move to it and the waiting time is the shortest or arbitrarily select a medical facility among the medical facilities of which the sum of the time taken for the mobile object to move to them and the waiting time falls within an allowable range. This can reduce the time taken until the client user receives treatment.

Said controller may further decide whether or not to transport said client user to said medical facility by an ambulance, and request dispatch of an ambulance to said first destination if said controller decides to transport said client user to said medical facility by an ambulance. When said controller decides to transport said client user to said medical facility by an ambulance, said controller may create said operation command so as to cause said mobile object to stay at said first destination with said client user aboard until an ambulance arrives at said first destination.

Since ambulances are given priority over other vehicles when running on the road, transporting the client user to a medical facility by an ambulance can bring the client user to the medical facility faster than transporting the client user to the medical facility by the mobile object in some cases. Moreover, the client user can be taken care of by a crew of the ambulance. Thus, if the client user is transferred from the mobile object to an ambulance and then transported to the medical facility by the ambulance, the client user can receive treatment earlier than in the case where the client user is transported to the medical facility directly by the mobile object. In that case, the mobile object does not need to move to the medical facility. Therefore the controller creates an operation command so as to cause the mobile object to stay at the first destination until an ambulance arrives. If the need for treatment of the client user is not urgent, the client user may be transported to the medical facility by the mobile object. This can reduce the frequency of use of ambulances.

Said mobile object may comprise a storage medium used to store the result of the medical examination of said client user, and a display that outputs the result of the medical examination of said client user stored in said storage medium.

If the result of the medical examination of the client user is stored, it is possible to use it in the medical facility to which the client user is transported by outputting it by the display. In the case where the client user is transferred from the mobile object to an ambulance, the result of the medical examination can be presented to a crew of the ambulance. This facilitates treatment of the client user.

According to another aspect to the present disclosure, there is provided a mobile object that moves autonomously comprising a controller configured to; perform control for moving said mobile object, and perform control relating to medical examination of a client user who is aboard said mobile object, wherein said controller performs control for transporting said client user to a destination determined on the basis of the result of the medical examination of said client user after said client user gets on said mobile object.

According to still another aspect of the present disclosure, there is provided a server included in an autonomous driving system including a mobile object that moves autonomously, comprising a controller configured to; create an operation command for said mobile object, and decide whether or not to transport a client user to a medical facility on the basis of a result of medical examination of said client user, wherein said controller is further configured to create said operation command so as to cause said mobile object to pick up said client user at a first destination, which is a location based on information sent from a client user's terminal used by said client user, and when said controller decides to transport said client user to said medical facility after said mobile object moves to said first destination, to transport said client user aboard the mobile object to said medical facility as a second destination.

As above, the present disclosure enables medical examination and transportation of users using a mobile object.

DESCRIPTION OF THE EMBODIMENTS

In the following, specific embodiments of the present disclosure will be described with reference to the drawings. The dimensions, materials, shapes, relative arrangements, and other features of the components that will be described in connection with the embodiments are not intended to limit the technical scope of the present disclosure only to them, unless otherwise stated. It should be understood that the features of the embodiments described below may be employed in any feasible combinations.

First Embodiment

<Outline of the System>

Figure 1:
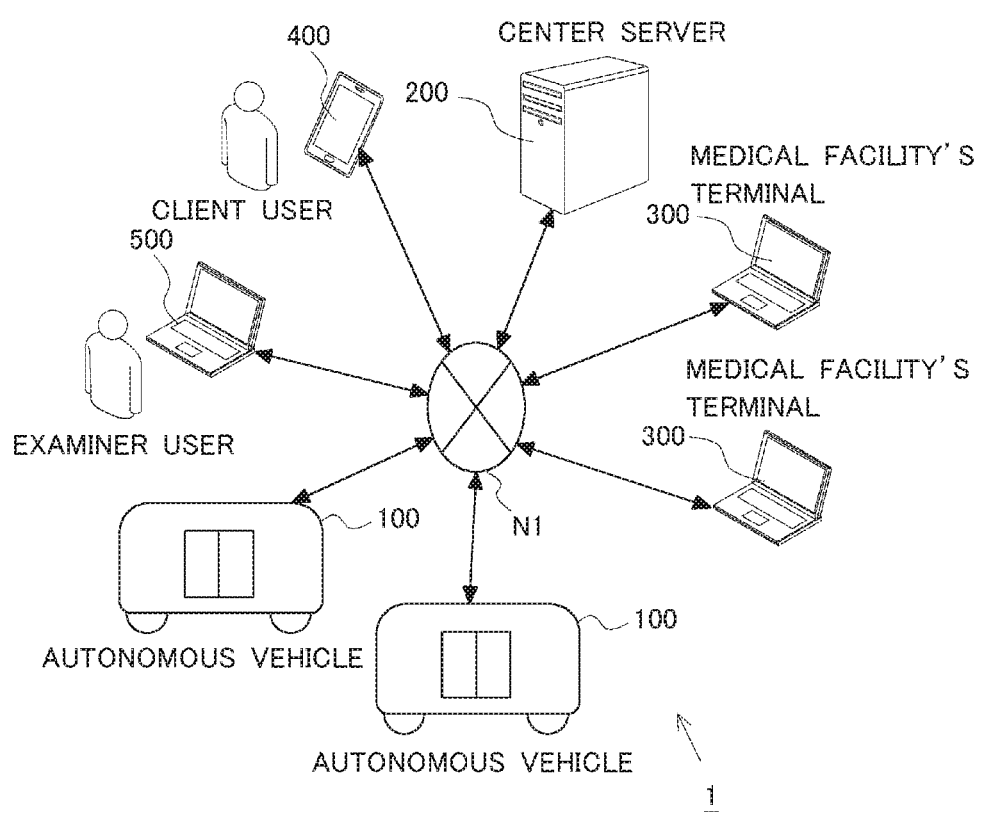
FIG. 1 is a diagram showing the generation configuration of an autonomous driving system.

The outline of an autonomous driving system 1 according to the first embodiment will be described with reference to FIG. 1. FIG. 1 shows the generation configuration of the autonomous driving system 1. The autonomous driving system 1 according to the first embodiment includes a plurality of autonomous vehicles 100 that can run autonomously according to given commands, a center server 200 that issues the commands, medical facility's terminals 300 managed by medical facilities, client user's terminals 400 used by client users, and examiner user's terminals 500 used by examiner users. The autonomous vehicles 100 will be also simply referred to as vehicles 100 hereinafter. The vehicles 100, the center server 200, the medical facility's terminals 300, the client user's terminals 400, and the examiner user's terminals 500 are connected with each other by a network N1. While the autonomous driving system 1 shown in FIG. 1 includes two vehicles 100 by way of example, the number of the vehicles 100 may be one or more than two. While the autonomous driving system 1 shown in FIG. 1 includes two medical facility's terminals 300 by way of example, the number of the medical facility's terminals 300 may be one or more than two. The client user is a user who makes a request for medical examination in a vehicle 100 or transportation to a medical facility by a vehicle 100. The examiner user is a user who conducts a medical examination of the client user from a remote place.

The center server 200 receives a request for medical examination in a vehicle 100 or transportation to a medical facility by a vehicle 100 from a client user's terminal 400. After receiving the request, the center server 200 creates an operation command so as to cause a vehicle 100 to be dispatched to the client user and sends the operation command to the vehicle 100. The vehicle 100 travels autonomously to a destination designated by the center server 200. The operation command includes information to the effect that the vehicle 100 should pick up the client user at the destination. After reaching the client user, the vehicle 100 picks up the client user and starts communication with an examiner user's terminals 500. The examiner user has an interview with the client user through the communication to examine the client user on the basis of the interview. The examiner user sends the result of the medical examination to the center server 200 through the examiner user's terminal 500. The center server 200 decides on the basis of the result of the medical examination whether or not to transport the client user to a medical facility. In the case where the center server 200 decides that the client user should be transported to a medical facility, the center server 200 sends to medical facility's terminals 300 a query as to whether or not the medical facilities can accept the client user. If there is a medical facility's terminal 300 that answers in the affirmative to the query, the center server 200 creates an operation command so as to cause the vehicle 100 to travel to the medical facility associated with that medical facility's terminal 300 with the client user aboard and sends it to the vehicle 100.

<System Configuration>

Figure 2:
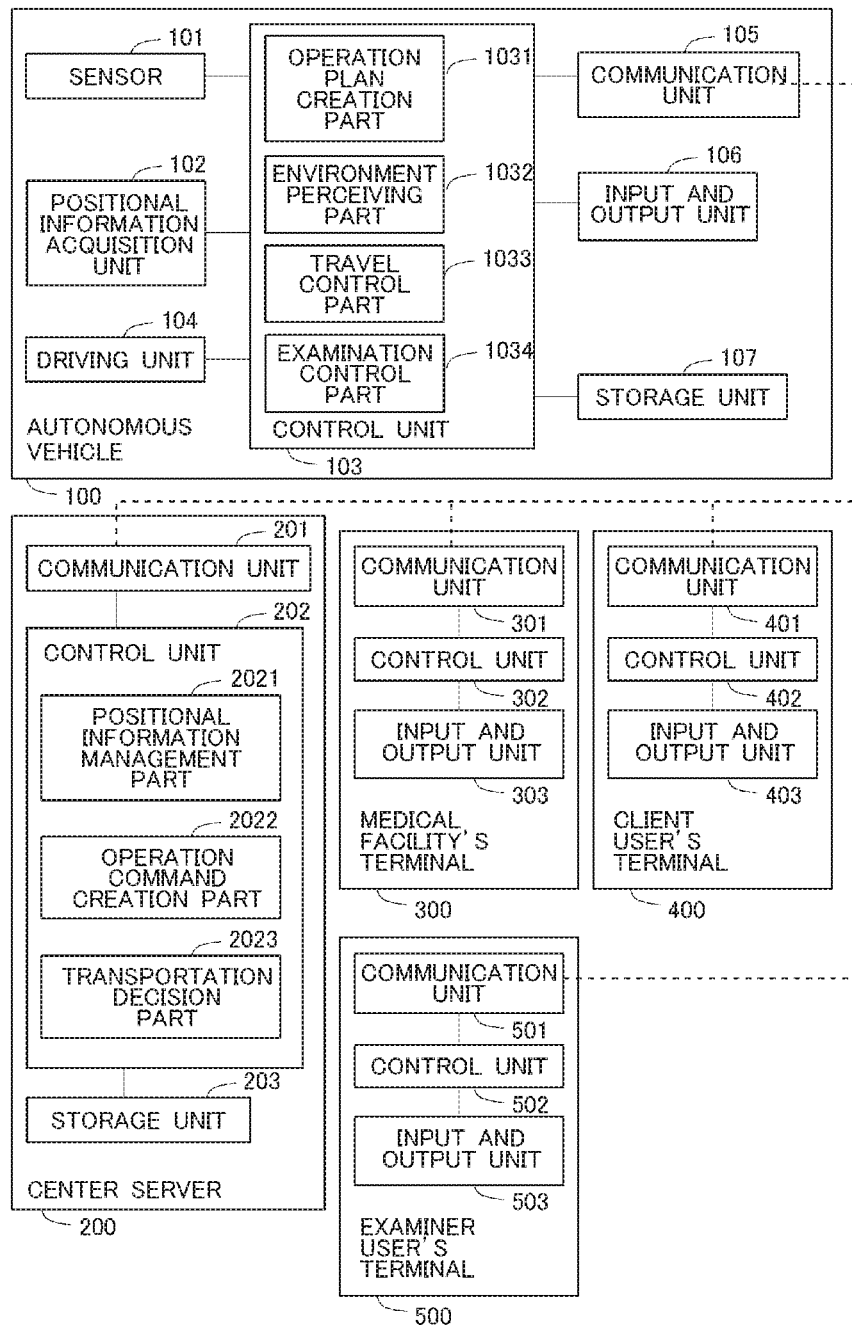
FIG. 2 is a block diagram showing an exemplary configuration of the autonomous driving system shown in FIG. 1.

Elements of the system will be described specifically. FIG. 2 is a block diagram showing an exemplary configuration of the autonomous driving system 1 shown in FIG. 1. While FIG. 2 shows one vehicle 100 and one medical facility's terminal 300 by way of example, the system may include a plurality of vehicles 100 and a plurality of medical facility's terminals 300.

The vehicle 100 travels according to operation commands received from the center server 200. Specifically, the vehicle 100 creates a travel route on the basis of an operation command received through wireless communication and travels on the road in an appropriate manner while sensing its environment. The vehicle 100 includes a sensor 101, a positional information acquisition unit 102, a control unit 103, a driving unit 104, a communication unit 105, an input and output unit 106, and a storage unit 107. The vehicle 100 operates by electrical power supplied by a battery, which is not shown in the drawings. The vehicle 100 corresponds to the mobile object according to the present disclosure.

The sensor 101 is means for sensing the environment of the vehicle, which typically includes a stereo camera, a laser scanner, a LIDAR, a radar, or the like. Data acquired by the sensor 101 is sent to the control unit 103. The positional information acquisition unit 102 is means for acquiring the current position of the vehicle, which typically includes a GPS receiver. Information acquired by the positional information acquisition unit 102 is sent to the control unit 103.

The control unit 103 is a computer that controls the vehicle 100 on the basis of the information acquired through the sensor 101. The control unit 103 is, for example, a microcomputer. The control unit 103 includes as functional modules an operation plan creation part 1031, an environment perceiving part 1032, a travel control part 1033, and an examination control part (examination controller) 1034. These functional modules may be implemented by executing programs stored in storage means, such as a read only memory (ROM), by a central processing unit (CPU), neither of which is shown in the drawings.

The operation plan creation part 1031 receives an operation command from the center server 200 and creates an operation plan of the vehicle. In this embodiment, the operation plan is data that specifies a route along which the vehicle 100 is to travel and a task(s) to be done by the vehicle 100 in a part or the entirety of that route. Examples of data included in the operation plan are as follows.

(1) data that specifies a route along which the vehicle is to travel by a set of road links The route along which the vehicle is to travel may be created automatically from a given place of departure and a given destination with reference to map data in storage means. Alternatively, the route may be created using an external service. Still alternatively, the route along which the vehicle is to travel may be provided by the center server 200. In other words, the route of travelling may be specified by the operation command.

(2) data specifying a task(s) to be done by the vehicle

Examples of the tasks to be done by the vehicle include, but are not limited to, picking up or dropping off a person(s) at a designated destination, communicating with an examiner user's terminal 500, collecting data about the client user, outputting an image(s) and/or a text message(s) to the input and output unit 106, and moving with the client user aboard. The operation plan created by the operation plan creation part 1031 is sent to the travel control part 1033, which will be described later.

The environment perceiving part 1032 perceives the environment around the vehicle using the data acquired by the sensor 101. What is perceived includes, but is not limited to, the number and the position of lanes, the number and the position of other vehicles present around the vehicle, and the number and the position of obstacles (e.g. pedestrians, bicycles, structures, and buildings) present around the vehicle. What is perceived may include anything that is useful for autonomous traveling. The environment perceiving part 1032 may track a perceived object(s). For example, the environment perceiving part 1032 may calculate the relative speed of the object from the difference between the coordinates of the object determined in a previous step and the current coordinates of the object. The data relating to the environment acquired by the environment perceiving part 1032 is sent to the travel control part 1033, which will be described below. This data will be hereinafter referred to as "environment data".

The travel control part 1033 controls the traveling of the vehicle on the basis of the operation plan created by the operation plan creation part 1031, the environment data acquired by the environment perceiving part 1032, and the positional information of the vehicle acquired by the positional information acquisition unit 102. For example, the travel control part 1033 causes the vehicle to travel along a predetermined route in such a way that obstacles will not enter a specific safety zone around the vehicle. A known autonomous driving method may be employed to drive the vehicle. The travel control part 1033 sends the positional information of the vehicle acquired by the positional information acquisition unit 102 to the center server 200 through the communication unit 105.

The examination control part 1034 controls the process relating to medical examination of the client user who gets on the vehicle 100 at the designated destination. The process relating to medical examination includes, but is not limited to, the process of communicating with an examiner user's terminal 500 for an interview of the client user by the examiner user, the process of operating various devices to examine the condition of the client user, and the process of inputting and outputting the contents of the interview to and through the input and output unit 106 during the interview of the client user by the examiner user. The process relating to medical examination may also include, for example, the process of examining the client user by the examination control part 1034.

The driving unit 104 is means for driving the vehicle 100 according to a command created by the travel control part 1033. The driving unit 104 includes, for example, a motor and inverter for driving wheels, a brake, and a steering system. The communication unit 105 serves as communication means for connecting the vehicle 100 to a network N1. In this embodiment, the communication unit 105 can communicate with other devices (e.g. the center server 200) via a network using a mobile communication service based on e.g. 3G or LTE.

The input and output unit 106 is means for receiving inputs by the user on the vehicle 100 and providing information to the user. Specifically, the input and output unit 106 includes a touch panel, a liquid crystal display, a keyboard, a mouse, a microphone, a speaker, a camera for capturing an image of the client user on the vehicle, sensors for sensing the condition of the client user on the vehicle, and controllers for these components. The touch panel and the liquid crystal display may be replaced by a touch panel display. The storage unit 107 is means for storing information, which is constituted by a storage medium such as a RAM, a magnetic disc, or a flash memory. Information stored in the storage unit 107 includes, for example, map data.

Now, the center server 200 will be described. The center server 200 is an apparatus configured to manage the position of the running vehicles 100 and send operation commands to the vehicles 100. For example, if the center server 200 receives a request for medical examination or transportation by a vehicle 100 from a client user, the center server 200 acquires the current location and the destination of the vehicles 100 and sends an operation command to a vehicle 100 that is running in the neighborhood of the location of the client user.

The center server 200 includes a communication unit 201, a control unit 202, and a storage unit 203. The communication unit 201 is, as with the above-described communication unit 105 of the vehicle 100, a communication interface for communication with the vehicles 100 and the medical facility's terminals 300 via a network. The control unit 202 is means for performing overall control of the center server 200. The control unit 202 is constituted by, for example, a CPU. The control unit 202 includes as functional modules a positional information management part 2021, an operation command creation part 2022, and a transportation decision part 2023. These functional modules may be implemented by executing programs stored in storage means, such as a read only memory (ROM), by the CPU, neither of which is shown in the drawings.

The positional information management part 2021 collects and manages positional information from the vehicles 100 under its management. Specifically, the positional information management part 2021 receives positional information from the vehicles 100 at predetermined intervals and stores it in association with the date and time in the storage unit 203, which will be described later.

When a request for medical examination or transportation by a vehicle 100 is received from a client user's terminal 400, the operation command creation part 2022 determines the vehicle 100 to be dispatched and creates an operation command for that vehicle 100. The request for medical examination or transportation by a vehicle 100 is received from the client user's terminal 400 via, for example, the Internet. The vehicle 100 to which the operation command is sent is determined taking account of the positional information of the vehicles 100 collected by the positional information management part 2021. The transportation decision part 2023 makes a decision as to whether the client user is to be transported to a medical facility or not on the basis of the result of the medical examination of the client user received from the examiner user's terminal 500 or the vehicle 100. The result of the decision is sent to the operation command creation part 2022, and the operation command creation part 2022 creates an operation command in accordance with the result of the decision. For example, in the case where the transportation decision part 2023 makes the decision that the client user is to be transported to a medical facility, the operation command creation part 2022 creates an operation command so as to cause the vehicle 100 to travel to the medical facility with the client user aboard. The storage unit 203 is means for storing information, which is constituted by a storage medium such as a RAM, a magnetic disc, or a flash memory.

Next, the medical facility's terminal 300 will be described. The medical facility's terminal 300 may be, for example, a personal computer or a small-size computer, such as a smartphone, a cellular phone, a tablet terminal, a personal information terminal, or a wearable computer (e.g. smart watch). The medical facility's terminal 300 has a communication unit 301, a control unit 302, and an input and output unit 303.

The communication unit 301 is communication means for connecting the medical facility's terminal 300 to the network N1. The medical facility's terminal 300 communicates with other devices (e.g. the center server 200) by the communication unit 301 via the network N1. The control unit 302 is a computer that performs overall control of the medical facility's terminal 300. The control unit 302 is constituted by, for example, a microcomputer, and functions for performing various processing are implemented by executing programs stored in storage means (not shown), such as a ROM, by a CPU (not shown).

The input and output unit 303 is means for receiving inputs by a user in a medical facility and providing information to the user in the medical facility. Specifically, the input and output unit 303 includes a touch panel, a liquid crystal display, a keyboard, a mouse, and controllers for these components.

Next, the client user's terminal 400 will be described. The client user's terminal 400 may be, for example, a personal computer or a small-size computer, such as a smartphone, a cellular phone, a tablet terminal, a personal information terminal, or a wearable computer (e.g. smart watch). The client user's terminal 400 has a communication unit 401, a control unit 402, and an input and output unit 403.

The communication unit 401 is communication means for connecting the client user's terminal 400 to the network N1. The client user's terminal 400 communicates with other devices (e.g. the center server 200) by the communication unit 401 via the network N1. The control unit 402 is a computer that performs overall control of the client user's terminal 400. The control unit 402 is constituted by, for example, a microcomputer. Functions for performing various processing are implemented by executing programs stored in storage means (not shown), such as a ROM, by a CPU (not shown).

The input and output unit 403 is means for receiving inputs by a client user and providing information to the client user. Specifically, the input and output unit 403 includes a touch panel, a liquid crystal display, a keyboard, a mouse, and controllers for these components.

Next, the examiner user's terminal 500 will be described. The examiner user's terminal 500 may be, for example, a personal computer or a small-size computer, such as a smartphone, a cellular phone, a tablet terminal, a personal information terminal, or a wearable computer (e.g. smart watch). The examiner user's terminal 500 has a communication unit 501, a control unit 502, and an input and output unit 503.

The communication unit 501 is communication means for connecting the examiner user's terminal 500 to the network N1. The examiner user's terminal 500 communicates with other devices (e.g. the vehicles 100 and the center server 200) by the communication unit 501 via the network N1. The control unit 502 is a computer that performs overall control of the examiner user's terminal 500. The control unit 502 is constituted by, for example, a microcomputer. Functions for performing various processing are implemented by executing programs stored in storage means, such as a ROM, by a CPU, neither of which is shown in the drawings.

The input and output unit 503 is means for receiving inputs by an examiner user and providing information to the examiner user. Specifically, the input and output unit 503 includes a touch panel, a liquid crystal display, a keyboard, a mouse, a microphone, a speaker, a camera for capturing an image of the examiner user, and controllers for these components. The input and output unit 503 is configured to be cooperative with the input and output unit 106 of the vehicle 100 to enable communication between the client user on the vehicle 100 and the examiner user.

<Operation of the System>

Figure 3:
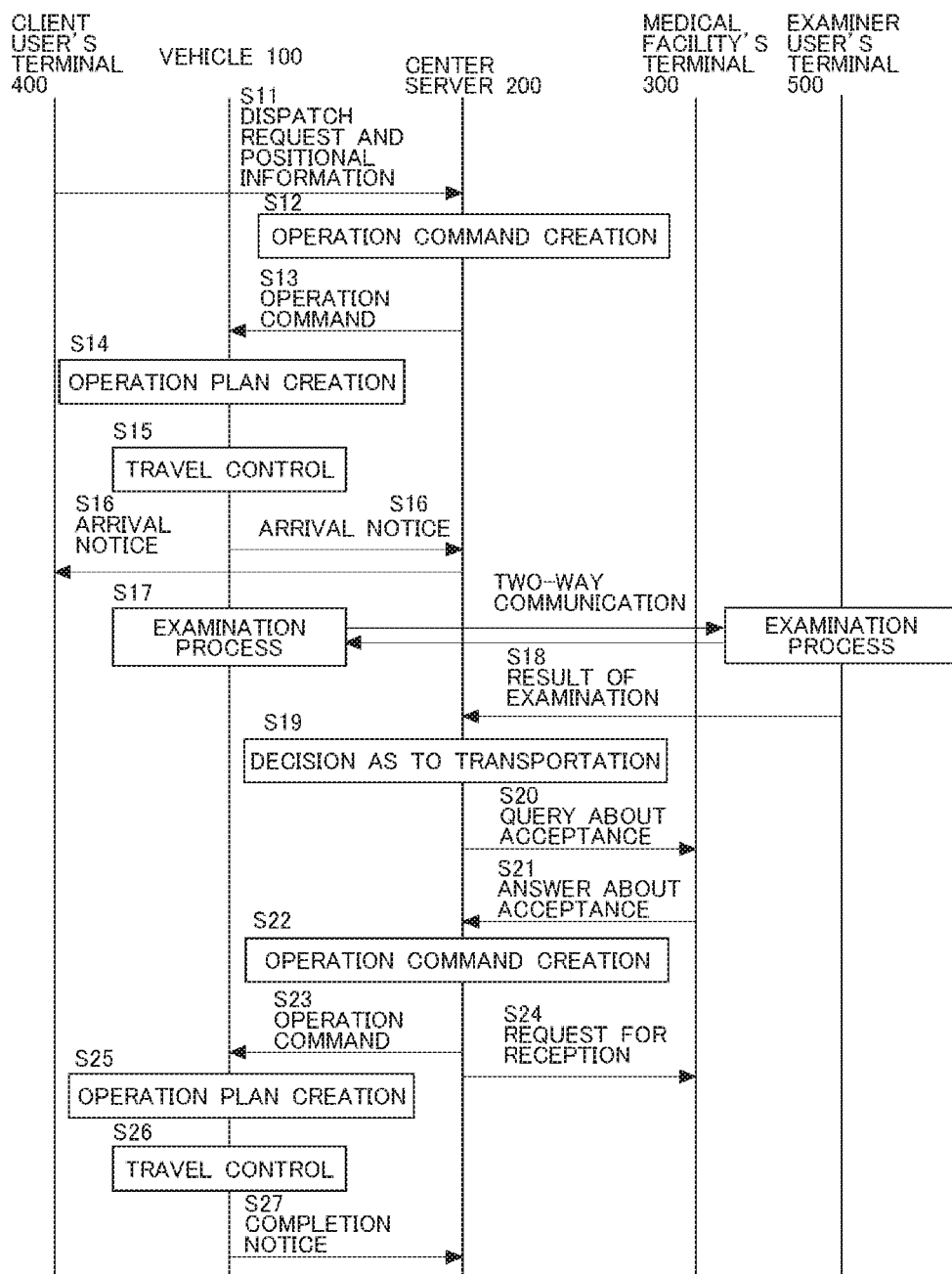
FIG. 3 is a diagram illustrating the operation of the autonomous driving system in a case where a client user is transported to a medical facility.

The operation of the autonomous driving system 1 in a case where a client user is transported to a medical facility will be described with reference to FIG. 3. In the process shown in FIG. 3, the client user's terminal 400 sends to the center server 200 a request for dispatch of a vehicle 100 to the client user (or a dispatch request) with positional information (processing of S11 in FIG. 3). Specifically, in response to a certain operation performed by the client user on the client user's terminal 400, the control unit 402 of the client user's terminal 400 displays an operation screen on the input and output unit 403, and then creates a dispatch request based on an operation performed by the client user on the operation screen. For example, the control unit 402 causes a touch panel display to show an icon or the like for making a dispatch request and creates a dispatch request based on an operation performed by the client user. The positional information is information specifying the location to which a vehicle 100 is to be dispatched. This location will be hereinafter referred to as the dispatch location. In this embodiment, the dispatch location corresponds to the first destination according to the present disclosure. The positional information may be input to the client user's terminal 400 by the client user. Alternatively, if the client user's terminal 400 is capable of acquiring positional information by means of a GPS receiver (not shown) or the like, the positional information thus acquired may be used. The control unit 402 of the client user's terminal 400 sends the dispatch request and the positional information as above to the center server 200 by the communication unit 401. Moreover, an ID number unique to the client user's terminal 400 may be sent to the center server 200 together with the dispatch request and the positional information.

After receiving the dispatch request and the positional information, the center server 200 creates an operation command so as to cause a vehicle 100 to travel to the location of the client user (i.e. the dispatch location) and to pick up the client user for the purpose of examination (processing of S12). Firstly, the operation command creation part 2022 refers to the positional information of the vehicles 100 collected by the positional information management part 2021 to choose the vehicle 100 located nearest to the dispatch location. This method of choice is not essential, but the operation command creation part 2022 may choose a vehicle 100, for example, on a random basis. The operation command creation part 2022 creates an operation command so as to cause the chosen vehicle 100 to travel to the dispatch location. The operation command created by the operation command creation part 2022 is sent to the vehicle 100 through the communication unit 201 (processing of S13). This operation command contains the positional information of the destination and information to the effect that the vehicle should pick up the client user at the dispatch location and perform a medical examination process. The operation plan creation part 1031 of the vehicle 100 that has received the operation command creates an operation plan based on the positional information contained in the operation command (processing of S14). Then, the travel control part 1033 performs travel control according to the operation plan (processing of S15). Specifically, the travel control part 1033 controls the driving unit 104 to move the vehicle 100 to the dispatch location (i.e. the first destination). Alternatively, the operation plan may be created by the center server 200 and sent to the vehicle 100 from the center server 200.

When the vehicle 100 arrives at the dispatch location, the travel control part 1033 of the vehicle 100 notifies the client user's terminal 400 of the arrival of the vehicle 100 at the dispatch location via the center server 200 (processing of S16). The control unit 402 of the client user's terminal 400 thus notified, for example, displays the arrival of the vehicle 100 on the input and output unit 403 to invite the client user to get on the vehicle 100. After getting on the vehicle 100, the client user, for example, clicks a specific icon shown on a display (a part of the input and output unit 106) or pushes a specific hardware switch. This causes a medical examination process to start. Alternatively, the vehicle 100 may be equipped with a motion detector (not shown), and the medical examination process may be started when the motion detector senses a human. The examination control part 1034 of the vehicle 100 and the control unit 502 of the examiner user's terminal 500 proceed with the medical examination process while performing two-way communication (processing of S17). The medical examination process enables communication between the client user and the examiner user, and the examiner user can interview the client user. The interview may be performed by either voice or text messages and figures, or both. The examiner user conducts a medical examination of the client user by the interview through the examiner user's terminal 500. For example, the examination control part 1034 of the vehicle 100 may display questions to the client user on the input and output unit 106, then the communication unit 105 of the vehicle 100 may send the client user's answers to the questions to the examiner user's terminal 500, then the input and output unit 503 of the examiner user's terminal 500 may display the answers, and the examiner user may examine the client user on the basis of the answers.

The examiner user inputs the result of the medical examination to the examiner user's terminal 500 through the input and output unit 503. The result of the medical examination is created in such a way as to enable the center server 200 to decide whether or not to transport the client user to a medical facility or to suggest whether or not to transport the client user to a medical facility to the center server 200. The result of the medical examination may further contain information that is helpful for later treatment of the client user. This information may include, for example, details of the interview, findings of the examiner user, and the name and address of the client user. The control unit 502 of the examiner user's terminal 500 sends the result of the medical examination input by the examiner user to the center server 200 through the communication unit 501 (processing of S18).

The transportation decision part 2023 of the center server 200 decides whether or not to transport the client user to a medical facility on the basis of the result of the medical examination it has received (processing of S19). For example, in the case where the result of the medical examination contains information suggesting transportation of the client user to a medical facility, the center server 200 decides that the client user is to be transported to a medical facility. The process of this decision is implemented by executing a program stored in the storage means, such as a ROM, by the CPU, neither of which is shown in the drawings. In the case where the transportation decision part 2023 of the center server 200 decides to transport the client user to a medical facility, the transportation decision part 2023 sends to a medical facility's terminal 300 a signal that asks whether or not the medical facility can accept the client user (processing of S20). This signal will also be referred to as an acceptability query signal. The acceptability query signal may be sent to a plurality of medical facility's terminals 300. The acceptability query signal may contain information of the result of the medical examination. When the medical facility's terminal 300 receives the acceptability query signal, its input and output unit 303 provides an indication of that fact. In response to this, a staff in the medical facility inputs an answer about the acceptability of the client user to the medical facility's terminal 300 through its input and output unit 303. The answer is sent from the communication unit 301 of the medical facility's terminal 300 to the center server 200 (processing of S21).

After the center server 200 receives answers about the acceptability from the medical facility's terminals 300, the operation command creation part 2022 of the center server 200 selects the medical facility to which the client user is to be transported from the medical facilities that have answered that they can accept the client user and creates an operation command to cause the vehicle 100 to travel to the selected medical facility with the client user aboard (processing of S22). In cases where there are a plurality of medical facilities that have answered that they can accept the client user, the operation command creation part 2022 selects, for example, the medical facility nearest to the dispatch location with reference to information about the locations of the medical facilities stored in advance in the storage unit 203. This method of selection is not essential, but the operation command creation part 2022 may select a medical facility on a random basis. Alternatively, if the medical facility to which the examiner user who examined the client user belongs can accept the client user, that medical facility may be selected. The process of this selection is implemented by executing a program stored in the storage means, such as a ROM, by the CPU, neither of which is shown in the drawings. In this embodiment, the medical facility to which the client user is transported corresponds to the second destination according to the present disclosure. The operation command creation part 2022 creates an operation command so as to cause the vehicle 100 to travel to the medical facility selected as above. The operation command created by the operation command creation part 2022 is sent to the vehicle 100 through the communication unit 201 (processing of step S23). This operation command contains location information of the medical facility. After receiving the operation command, the operation plan creation part 1031 of the vehicle 100 creates an operation plan according to the location information contained in the operation command (processing of S25). Then, the travel control part 1033 performs travel control according to the operation plan (processing of S26). In consequence, the vehicle 100 moves with the client user aboard.

Simultaneously with the processing of S23, the operation command creation part 2022 of the center server 200 sends a signal requesting reception of the client user to the medical facility's terminal 300 of the medical facility to which the client user is to be transported (processing of S24). The result of the medical examination may be sent to the medical facility's terminal 300 at the same time.

After the vehicle 100 arrives at the medical facility and the client user gets off the vehicle 100, the travel control part 1033 of the vehicle 100 sends a signal indicating the completion of transportation of the client user to the center server 200 (processing of S27). The getting-off of the client user from the vehicle 100 may be detected by a motion sensor (not shown). The getting-off of the client user from the vehicle 100 may be determined by an input indicating the getting-off of the client user made to the input and output unit 106 by the client user or a staff of the medical facility.

Returning back to the processing of S19, in the case where the transportation decision part 2023 of the center server 200 decides not to transport the client user to a medical facility, the input and output unit 106 of the vehicle 100 is caused to provide an indication of that fact to inform the client user of that fact. In that case, the examination control part 1034 of the vehicle 100 requests the client user to get off the vehicle 100 at that location. After the client user gets off the vehicle 100, the vehicle 100 notifies the center server 200 of the completion of the getting-off of the client user.

Figure 4:
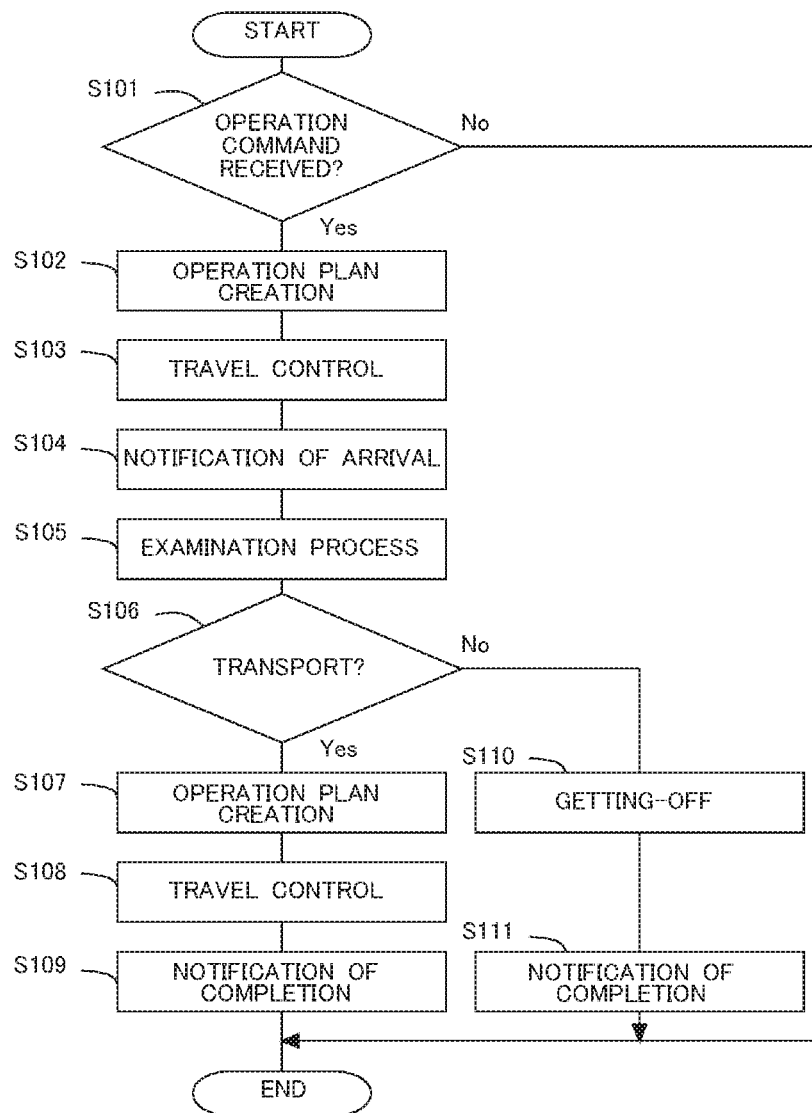
FIG. 4 is a flow chart of a control process performed in a vehicle.

FIG. 4 is a flow chart of a control process performed by the vehicle 100. The process shown in FIG. 4 is executed at predetermined intervals by the control unit 103 of the vehicle 100. While this control process is not being performed, the vehicle 100 runs along a certain route, stays on standby at a certain place, or is employed for other purposes. In step S101, the operation plan creation part 1031 determines whether or not an operation command has been received from the center server 200. If an affirmative determination is made in step S101, the process proceeds to step S102. If a negative determination is made in step S101, this process is terminated. In step S102, the operation plan creation part 1031 creates an operation plan based on the dispatch location contained in the received operation command. Then in step S103, the travel control part 1033 performs travel control so as to move the vehicle 100 to the destination according to the operation plan. When the vehicle 100 arrives at the dispatch location, the travel control part 1033 sends to the client user's terminal 400 a signal indicating the arrival of the vehicle 100 at the dispatch location in step S104.

In step S105, the examination control part 1034 proceeds with a medical examination process. In the medical examination process, information input by the examiner user to the input and output unit 503 of the examiner user's terminal 500 is sent from the examiner user's terminal 500, and the vehicle 100 receives the information. The vehicle 100 outputs the received information to its input and output unit 106. The vehicle 100 sends information input by the client user to the input and output unit 106 of the vehicle 100 to the examiner user's terminal 500. Thus, an interview by the examiner user is performed. The two-way communication between the vehicle 100 and the examiner user's terminal 500 may be performed via the center server 200. After the completion of the medical examination process, the examination control part 1034 determines, in step S106, whether or not to transport the client user to a medical facility. Specifically, the center server 200 receives the result of the medical examination after the completion of the medical examination process and decides whether or not to transport the client user to a medical facility on the basis of the result of the medical examination it has received. In the case where the center server 200 decides not to transport the client user to a medical facility, the center server 200 sends a signal indicating that decision to the vehicle 100. On the other hand, in the case where the center server 200 decides to transport the client user to a medical facility, the center server 200 sends an operation command to the vehicle 100 to cause the vehicle 100 to travel to a medical facility with the client user aboard. Thus, the examination control part 1034 of the vehicle 100 determines whether or not to transport the client user to a medical facility on the basis of the signal sent from the center server 200. If an affirmative determination is made in step S106, the process proceeds to step S107. If a negative determination is made in step S106, the process proceeds to step S110.

In step S107, the operation plan creation part 1031 creates an operation plan based on the location information of the medical facility contained in the operation command the vehicle 100 has received. In step S108, the travel control part 1033 performs travel control so as to cause the vehicle 100 to move to the destination according to the operation plan. After the vehicle 100 arrives at the destination and the client user gets off the vehicle 100, the travel control part 1033 sends a signal indicating the completion of transportation (or completion notice) to the center server 200, in step S109. In step S110, a getting-off process is performed. The getting-off process is the process of outputting a request for getting-off to the input and output unit 106 of the vehicle 100. At the same time, the result of the medical examination may also be output to the input and output unit 106. After the getting-off of the client user, the travel control part 1033 sends a signal indicating the completion of getting-off (or completion notice) to the center server 200 in step S111.

Besides the function of examining and transporting a client users, the vehicle 100 may have other functions, which may vary among individual vehicles 100. For example, the vehicle 100 may also function as a vehicle that runs along a predetermined route to pick up and drop off passengers, an on-demand taxi that operates on users' demand, and a mobile shop that enables shop operation at a desired destination. In the case where the vehicle 100 is intended for transportation of passengers and/or goods, it may transport passengers and/or goods along a predetermined route. In the case where the vehicle 100 is intended for transportation of a shop, facility, or equipment, it may travel to a destination and open or prepare the shop, facility, or equipment for operation at that place. The vehicle 100 may be a vehicle that patrol on the road for the purpose of monitoring facilities and/or infrastructures or preventing crimes. In this case, the vehicle 100 may travel along a predetermined patrol route. The vehicle 100 is not required to be a vehicle without humans aboard. For example, the vehicle may be crewed by a nurse.

In this and the following embodiments described below, some of the functions of the center server 200 may be taken over by the medical facility's terminal 300, or some or all of the functions of the medical facility's terminal 300 may be taken over by the center server 200. A single device may serve as both the center server 200 and the medical facility's terminal 300. In this and the following embodiments, some or all of the functions of the examiner user's terminal 500 may be taken over by the medical facility's terminal 300, or some or all of the functions of the medical facility's terminal 300 may be taken over by the examiner user's terminal 500. A single device may serve as both the examiner user's terminal 500 and the medical facility's terminal 300. In this and the following embodiments, some or all of the functions of the center server 200 may be taken over by the vehicle 100, or some or all of the functions of the vehicle 100 may be taken over by the center server 200. For example, the vehicle 100 may be provided with a transportation decision part, and the vehicle 100 may receive the result of the medical examination from the examiner user's terminal 500 to decide whether or not to transport the client user to a medical facility. Moreover, the vehicle 100 may be provided with an operation command creation part, and when it is decided to transport the client user to a medical facility, the vehicle 100 may create an operation command to transport the client user to the medical facility.

As above, according to this embodiment, medical examination can be carried out using the vehicle 100. Moreover, if it is decided that a client user needs to be brought to a medical facility, the vehicle 100 can directly transport him or her to the medical facility.

Second Embodiment

Figure 5:
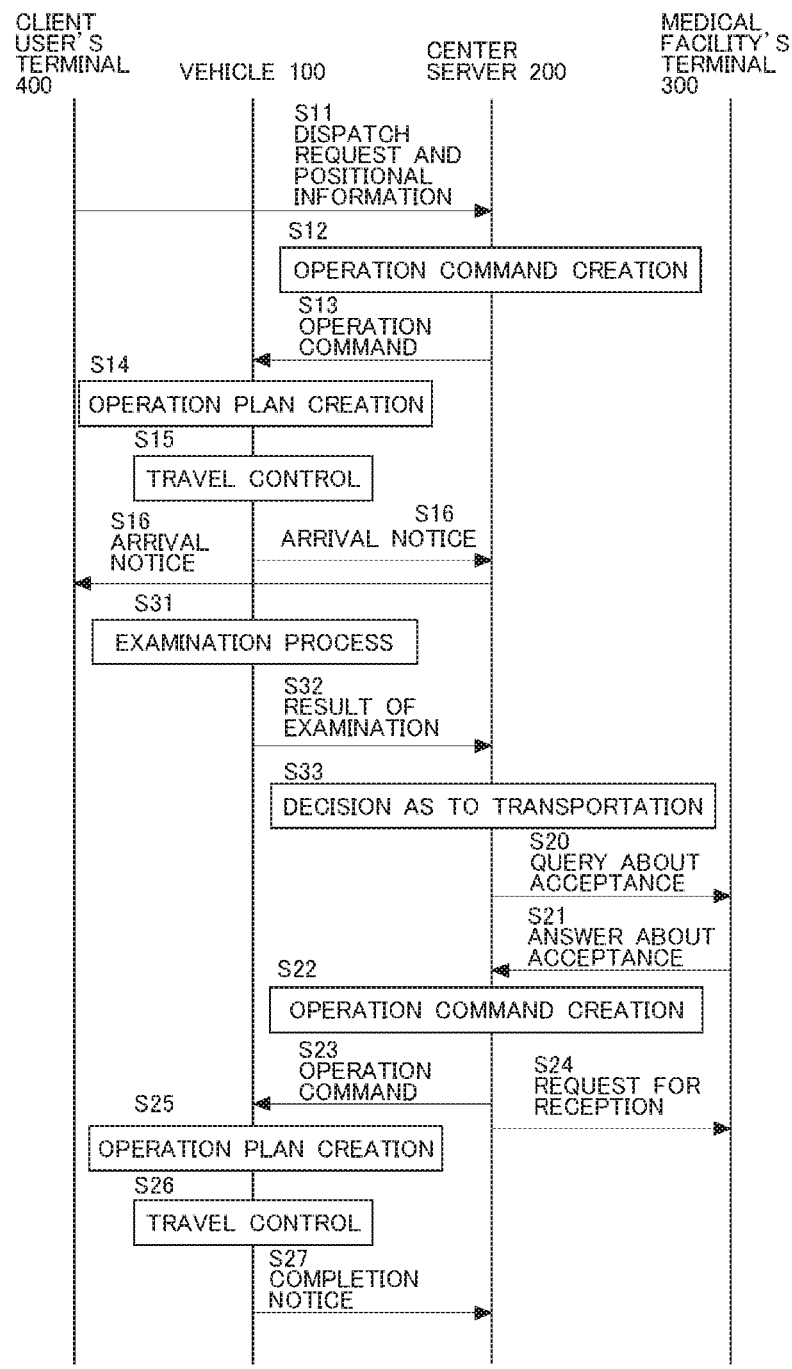
FIG. 5 is a diagram illustrating the operation of the autonomous driving system in a case where a client user is transported to a medical facility according to a second embodiment.

In the second embodiment, medical examination of the client user is performed by the vehicle 100. Therefore, no examiner user's terminal 500 is needed. The operation of the autonomous driving system 1 in that case will be described with reference to FIG. 5. In FIG. 5, the processing steps same as those in the process shown in FIG. 3 are denoted by the same reference signs, and they will not be described further. In the process shown in FIG. 5, after the client user gets on the vehicle 100, the examination control part 1034 of the vehicle 100 performs a medical examination process (processing of S31). In the medical examination process according to the second embodiment, the examination control part 1034 of the vehicle 100 performs a medical interview of the client user through the input and output unit 106. The examination control part 1034 of the vehicle 100 outputs questions stored in the storage unit 107 to the input and output unit 106. The interview proceeds by client user's input of answers to the questions to the input and output unit 106. In addition, detections or examinations using sensors (not shown) may also be performed on the client user. Furthermore, an examination of a specimen, such as urine may be performed. The interview may be performed by either voice or text messages and figures, or both. The medical examination process is implemented by executing a program stored in the storage means, such as a ROM, by the CPU, neither of which is shown in the drawings.

After the completion of the medical examination by the examination control part 1034 in the vehicle 100, the examination control part 1034 sends the result of the medical examination to the center server 200 through the communication unit 105 (processing of S32). The result of the medical examination is created in such a way as to enable the center server 200 to decide whether or not to transport the client user to a medical facility or to suggest whether or not to transport the client user to a medical facility to the center server 200. The result of the medical examination may further contain information input to the input and output unit 106 by the client user that is helpful for later treatment of the client user. This information may include, for example, details of the interview and the name and address of the client user. After receiving the result of the medical examination sent from the vehicle 100, the transportation decision part 2023 of the center server 200 decides whether or not to transport the client user to a medical facility on the basis of the result of the medical examination it has received (processing of S33). This decision is made in the same manner as the above-described processing of S19.

In the case show in FIG. 5, the vehicle 100 performs the interview. Alternatively, the vehicle 100 may be crewed by a nurse, and the nurse may perform an interview of the client user and input the answers to the interview to the input and output unit 106 of the vehicle 100.

As above, according to this embodiment, medical examination can be carried out using the vehicle 100 without examination by an examiner user. In the case where it is necessary to bring the client user to a medical facility, the vehicle 100 can directly transport the client user to the medical facility.

Third Embodiment

Figure 6:
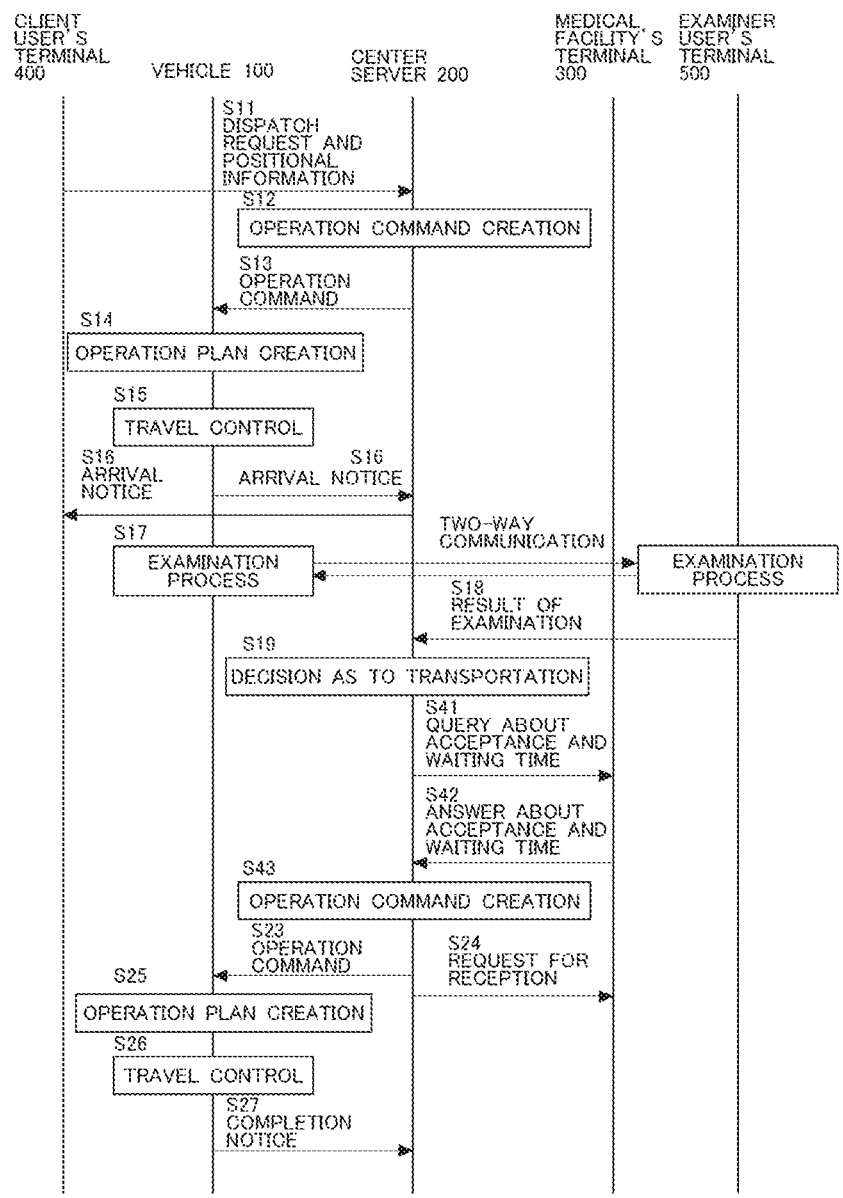
FIG. 6 is a diagram illustrating the operation of the autonomous driving system in a case where a client user is transported to a medical facility according to a third embodiment.

In the case where the client user is transported to a medical facility, there is a possibility that the medical facility is so busy that it takes time until the client user receives medical treatment. In view of this, in the third embodiment, the client user is transported to a medical facility with shorter waiting time so as to shorten the time taken until the client user receives medical treatment. For this purpose, when sending a query as to the acceptability of the client user to medical facility's terminals 300, the center server 200 also asks current waiting time until treatment. If a medical facility can accept the client user, it informs the center server 200 of that fact and waiting time in answer. The center server 200 selects, for example, the medical facility with the shortest waiting time from the medical facilities that have answered to the query. The operation of the autonomous driving system 1 in that case will be described with reference to FIG. 6. In FIG. 6, the processing steps same as those in the process shown in FIG. 3 are denoted by the same reference signs, and they will not be described further. In the process shown in FIG. 6, if it is decided in the processing of S19 that the client user is to be transported to a medical facility, the transportation decision part 2023 of the center server 200 sends to a medical facility's terminal 300 an acceptability query signal and a signal that asks waiting time (or waiting time query signal) (processing of S41). These signals may be sent to a plurality of medical facility's terminals 300. When the medical facility's terminal 300 receives the acceptability query signal and the waiting time query signal, the input and output unit 303 of the medical facility's terminal 300 provides an indication of that fact. In response to this, a staff in the medical facility inputs an answer about the acceptability of the client user to the input and output unit 303. In the case where the medical facility can accept the client user, the staff of the medical facility further inputs the answer about waiting time to the input and output unit 303.

The answer input to the input and output unit 303 of the medical facility's terminal 300 is sent to the center server 200 through the communication unit 301 (processing of step S42). After the center server 200 receives answers about the acceptability from the medical facility's terminals 300, the transportation decision part 2023 of the center server 200 selects the medical facility with the shortest waiting time among the medical facilities that have answered that they can accept the client user and creates an operation command to cause the vehicle 100 to travel to the thus-selected medical facility (processing of S43). In cases where there are a plurality of medical facilities of which the waiting time falls within an allowable range, the transportation decision part 2023 of the center server 200 may selects a medical facility among them arbitrarily. The transportation decision part 2023 may calculate the sum of the time taken for the vehicle 100 to travel from the current location to each medical facility and the waiting time in each medical facility and select the medical facility with the shortest total time. The time taken for the vehicle 100 to travel from the current location to each medical facility is calculated by the operation command creation part 2022 of the center server 200 taking account of the distance from the current location of the vehicle 100 to each medical facility and the speed limit of the road. The process of selecting the medical facility is implemented by executing a program stored in the storage means, such as a ROM, by the CPU, neither of which is shown in the drawings.

As above, according to this embodiment, the vehicle 100 can transport the client user to a medical facility with shorter waiting time. Therefore, the client user can receive treatment promptly.

Fourth Embodiment

In the fourth embodiment, a medical facility is selected on the basis of the result of the medical examination. Depending on the condition of the client user, it may be desirable that the client user be treated in the medical facility that can provide suitable treatment. Moreover, in cases where the need for treatment of the client user is urgent, it will be desirable that the client user be treated in the medical facility that can treat him or her promptly.

Figure 7:
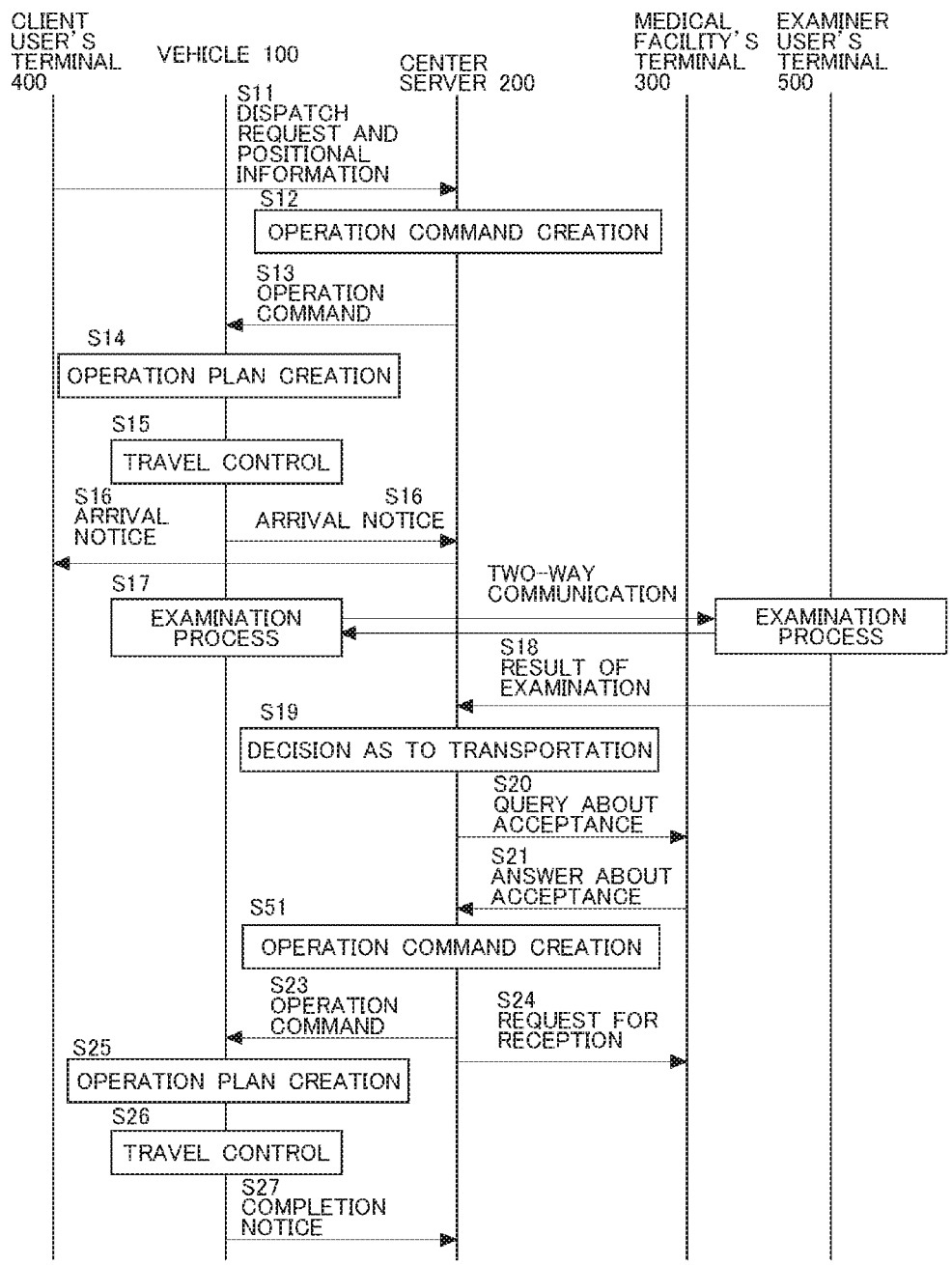
FIG. 7 is a diagram illustrating the operation of the autonomous driving system in a case where a client user is transported to a medical facility according to a fourth embodiment.

In the fourth embodiment, the center server 200 selects a medical facility to which the client user is to be transported according to the result of the medical examination. The operation of the autonomous driving system 1 in that case will be described with reference to FIG. 7. In FIG. 7, the processing steps same as those in the process shown in FIG. 3 are denoted by the same reference signs, and they will not be described further. In the process shown in FIG. 7, after receiving answers to the query as to the acceptability sent from medical facility's terminals 300 in the processing S21, the transportation decision part 2023 of the center server 200 selects a suitable medical facility in view of the result of the medical examination from the medical facilities that have answered that they can accept the client user and creates an operation command to cause the vehicle 100 to travel to the selected medical facility (processing of S51). The examiner user's terminal 500 may create the result of the medical examination in such a way as to enable selection of a medical facility based on the result of the medical examination. Alternatively, relationship between the result of the medical examination and the medical facility to be selected may be prepared and stored in advance in the storage unit 203. When sending a query as to the acceptability of the client user to the medical facility's terminal 300, the center server 200 may also send the result of the medical examination of the client user to ask whether or not the medical facility can provide suitable treatment in view of the result of the medical examination. The process of the selection of a medical facility can be implemented by executing a program stored in the storage means, such as a ROM, by the CPU, neither of which is shown in the drawings.

As above, according to this embodiment, the vehicle 100 can transport the client user to an appropriate medical facility on the basis of the result of the medical examination.

Fifth Embodiment

Depending on the condition of the client user, it is necessary to transport him or her to a medical facility promptly in some cases. In this connection, transporting the client user to a medical facility by an ambulance can bring the client user to the medical facility faster than transporting the client to the medical facility by the vehicle 100 in some cases. In other words, the ambulance can arrive at the medical facility earlier than the vehicle 100, because ambulances are given priority over other vehicles when running on the road. Therefore, in this embodiment, when it is determined by the center server 200 that the need for transportation is urgent, the center server 200 calls an ambulance to the current location of the vehicle 100 (i.e. the first destination) to let it transport the client user.

Figure 8:
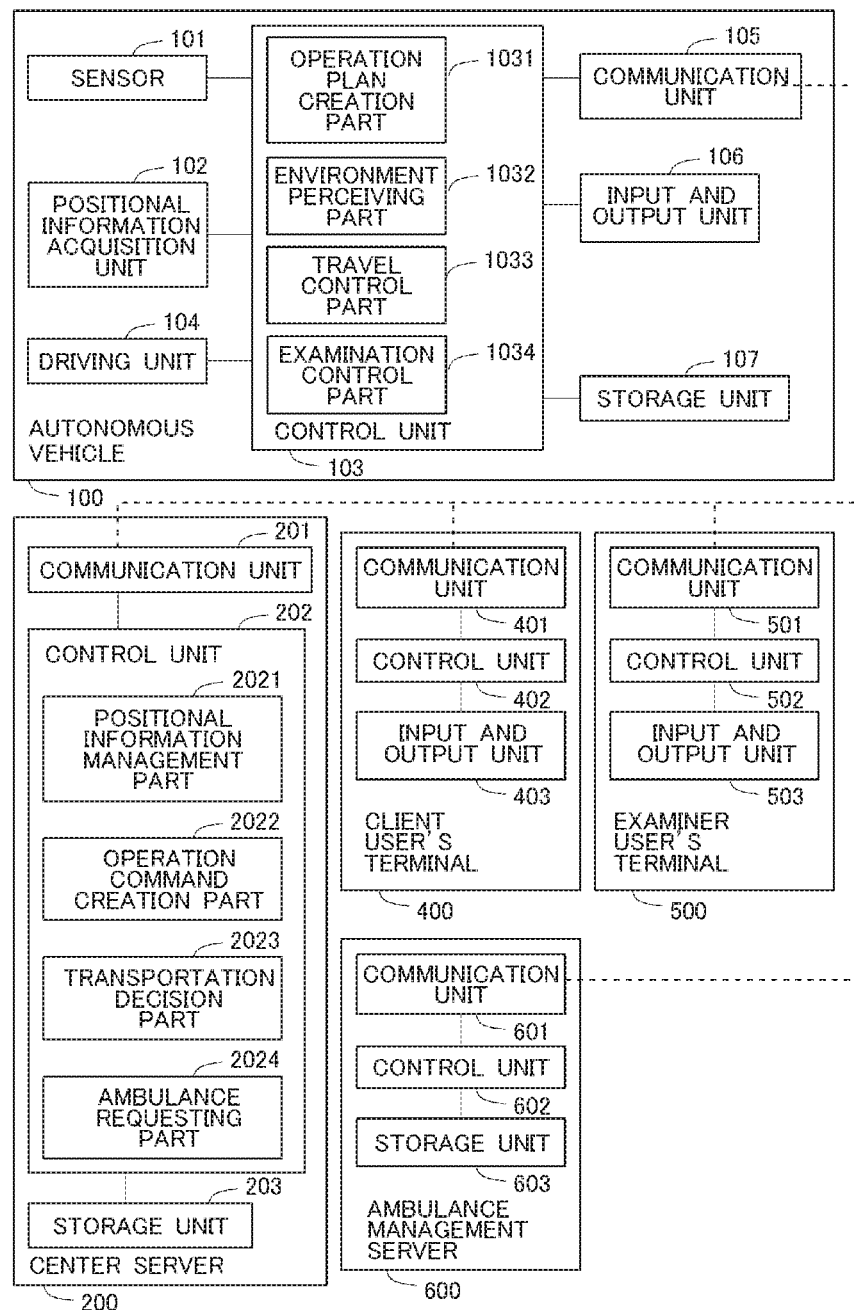
FIG. 8 is a block diagram showing an exemplary configuration of the autonomous driving system according to a fifth embodiment.

FIG. 8 is a block diagram showing an exemplary configuration of an autonomous driving system 1 according to the fifth embodiment. In the following, features that are different from the autonomous driving system 1 shown in FIG. 2 will be mainly described. The system according to the fifth embodiment includes an ambulance management server 600 instead of the medical facility's terminal shown in FIG. 2. The ambulance management server 600 is a server that manages dispatch of ambulance. The ambulance management server 600 receives from the center server 200 a request for transportation to a medical facility by an ambulance. After receiving the request, the ambulance management server 600 sends a command to an ambulance to request it to go to the current location of the vehicle 100. A crew of the ambulance that has received the command drives the ambulance to the current location of the vehicle 100.

The ambulance management server 600 includes a communication unit 601, a control unit 602, and a storage unit 603. The communication unit 601 is a communication interface similar to the above-described communication unit 201 of the center server 200 for communication with the center server 200 or other terminals via a network. The control unit 602 is means for performing overall control of the ambulance management server 600. The control unit 602 is constituted by, for example, a CPU. The control unit 602 executes programs stored in storage means, such as a ROM, by a CPU, neither of which is shown in the drawings. The storage unit 603 is means for storing information, which is constituted by a storage medium, such as a RAM, a magnetic disc, or a flash memory.

The control unit 202 of the center server 200 includes an ambulance requesting part 2024 as a functional module. The ambulance requesting part 2024 may be implemented by executing a program stored in the storage means, such as a ROM, by the CPU, neither of which is shown in the drawings. When the transportation decision part 2023 decides that the client user should be transported to a medical facility by an ambulance, the ambulance requesting part 2024 sends to the ambulance management server 600 a request for dispatch of an ambulance to the current location of the vehicle 100 (i.e. the first destination). The transportation decision part 2023 decides whether or not the client user should be transported to a medical facility by an ambulance on the basis of the result of the medical examination it has received from the examiner user's terminal 500.

Figure 9:
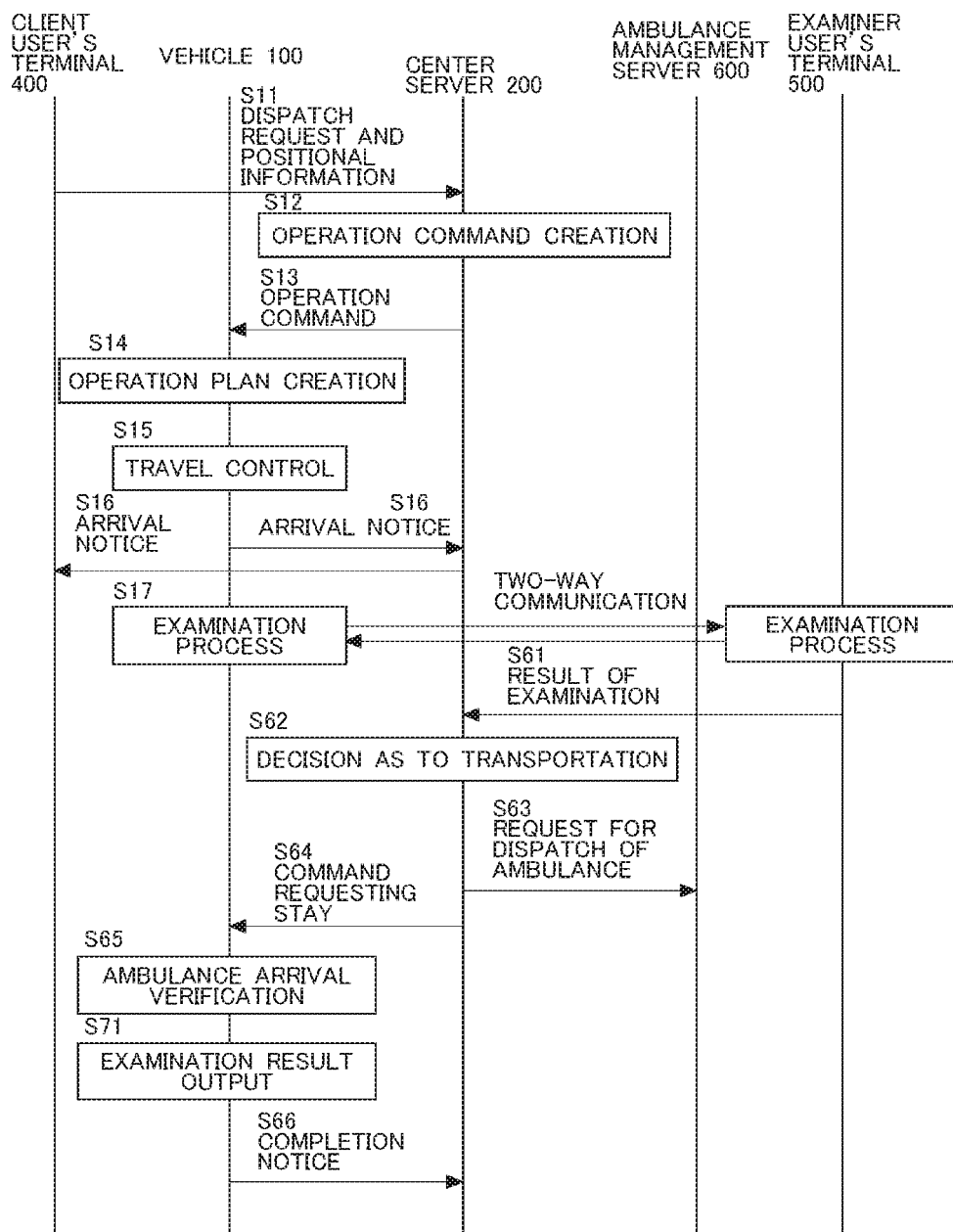
FIG. 9 is a diagram illustrating the operation of the autonomous driving system in a case where a client user is transported to a medical facility according to the fifth embodiment.

The operation of the autonomous driving system 1 according to the fifth embodiment will be described with reference to FIG. 9. In FIG. 9, the processing steps same as those in the process shown in FIG. 3 are denoted by the same reference signs, and they will not be described further. In the process shown in FIG. 9, after the completion of the examination of the client user by the examiner user in the processing of S17, the examiner user inputs the result of the medical examination to the examiner user's terminal 500. The result of the medical examination is created in such a way as to enable the center server 200 to decide whether or not to transport the client user to a medical facility or to suggest whether or not to transport the client user to a medical facility to the center server 200. Moreover, the result of the medical examination is created in such a way as to enable the center server 200 to decide whether or not to transport the client user to a medical facility by an ambulance or to suggest whether or not to transport the client user to a medical facility by an ambulance to the center server 200. The result of the medical examination may further contain information that is helpful for later treatment of the client user. This information may include, for example, details of the interview, findings of the examiner user, and the name and address of the client user. The control unit 502 of the examiner user's terminal 500 sends the result of the medical examination to the center server 200 through the communication unit 501 (processing of S61).

The transportation decision part 2023 of the center server 200 decides whether or not to transport the client user to a medical facility on the basis of the result of the medical examination it has received. If the transportation decision part 2023 decides to transport the client user to a medical facility, it further decides whether or not to transport the client user by an ambulance (processing of S62). For example, if the result of the medical examination includes information that suggests transporting the client user to a medical facility by an ambulance, the transportation decision part 2023 decides to transport the client user to a medical facility by an ambulance. In the case where the transportation decision part 2023 decide to transport the client user to a medical facility by an ambulance, the ambulance requesting part 2024 sends a signal requesting dispatch of an ambulance to the ambulance management server 600 (processing of S63). This signal contains information of the current location of the vehicle 100 (i.e. the dispatch location) and information of the result of the medical examination. When the control unit 602 of the ambulance management server 600 receives the signal requesting dispatch of an ambulance from the center server 200, the control unit 602 of the ambulance management server 600 sends a command to an ambulance to request it to go to the current location of the vehicle 100.

In the case where the center server 200 decides that the client user should be transported by an ambulance, the operation command creation part 2022 of the center server 200 creates an operation command that requests the vehicle to stay at the current location and sends the operation command to the vehicle 100 (processing of S64). When receiving this operation command, the operation plan creation part 1031 of the vehicle 100 causes the vehicle 100 to stay at the current position until the ambulance comes. After the arrival of the ambulance is verified (processing of S65) and the client user gets off the vehicle 100, the travel control part 1033 of the vehicle 100 sends to the center server 200 a signal indicating the completion of the getting-off of the client user (processing of S66). For example, a crew of the ambulance makes an input indicating the arrival of the ambulance to the input and output unit 106 of the vehicle 100. The travel control part 1033 of the vehicle 100 verifies the arrival of the ambulance by this input. The getting-off of the client user from the vehicle 100 may be detected by a motion sensor (not shown). Alternatively, the client user or a crew of the ambulance may make an input indicating the getting-off of the client user from the vehicle 100 to the input and output unit 106 of the vehicle 100.

When the arrival of the ambulance is verified in the processing of S65, the examination control part 1034 of the vehicle 100 may output the result of the medical examination stored in the storage unit 107 through the input and output unit 106 (processing of S71). This enables a crew of the ambulance to know the condition of the client user promptly. This output may be performed in response to a request by a crew of the ambulance. For example, the examination control part 1034 may be configured to output the result of the medical examination through the input and output unit 106 in response to entry of a predetermined authentication code to the input and output unit 106 of the vehicle 100 by the crew of the ambulance.

In the above-described case, the result of the medical examination is provided for the crew of the ambulance. In the case where the vehicle 100 transports the client user to a medical facility, the examination control part 1034 may output the result of the medical examination through the input and output unit 106 for a staff of the medical facility (e.g. a doctor or nurse).

As above, according to this embodiment, after the client user is examined in the vehicle 100, it is possible to transport the client user to a medical facility by an ambulance. This can reduce the time taken until the client user receives treatment. Moreover, this system can prevent ambulances from being called more than necessary, leading to an increase in the availability of ambulances.

What is claimed is:

1. An autonomous driving system comprising:
    a mobile object that moves autonomously on the basis of an operation command comprising an examination controller configured to perform control relating to a medical examination of a client user in said mobile object; and
    a controller configured to:
        decide whether or not to transport said client user to a medical facility on the basis of a result of the medical examination of said client user;
        transmit to the mobile object a first operation command instructing the mobile object to pick up said client user at a first destination, which is a location based on information sent from a client user's terminal used by said client user; and
        transmit to the mobile object a second operation command instructing the mobile object to transport said client user aboard the mobile object to said medical facility as a second destination in response to deciding to transport said client user to said medical facility after said mobile object moves to said first destination,
    wherein in cases where there are a plurality of medical facilities, said controller is further configured to select a medical facility as said second destination according to the result of the medical examination of said client user.

2. An autonomous driving system according to claim 1, further comprising an examiner user's terminal used by an examiner user who conducts a medical examination of said client user and communicating with said client user's terminal, wherein said examiner user's terminal is configured to create the result of the medical examination of said client user.

3. An autonomous driving system according to claim 1, wherein said examination controller is further configured to create the result of the medical examination of said client user in said mobile object.

4. An autonomous driving system according to claim 1, wherein in cases where there are a plurality of medical facilities, said controller is further configured to select a medical facility as said second destination taking account of waiting time taken until said client user receives treatment.

5. An autonomous driving system according to claim 1, wherein said controller is further configured to;
   decide whether or not to transport said client user to said medical facility by an ambulance,
   request dispatch of an ambulance to said first destination if said controller decides to transport said client user to said medical facility by an ambulance, and
   transmit to said mobile object a third operation command instructing said mobile object to stay at said first destination with said client user aboard until an ambulance arrives at said first destination, when said controller decides to transport said client user to said medical facility by an ambulance.

6. An autonomous driving system according to claim 1, wherein said mobile object comprises:
   a storage medium used to store the result of the medical examination of said client user; and
   a display that outputs the result of the medical examination of said client user stored in said storage medium.

7. A mobile object that moves autonomously comprising:
   a controller configured to:
   perform control for moving said mobile object autonomously;
   perform control relating to medical examination of a client user who is aboard said mobile object; and
   perform control for transporting said client user to a destination determined on the basis of a result of the medical examination of said client user after said client user gets on said mobile object,
   wherein in cases where there are a plurality of medical facilities, said controller is further configured to select a medical facility as said destination on the basis of the result of the medical examination of said client user.

8. A server comprising:
a controller configured to:
   decide whether or not to transport a client user to a medical facility on the basis of a result of medical examination of said client user,
   transmit to a mobile object moving autonomously a first operation command instructing said mobile object to pick up said client user at a first destination, which is a location based on information sent from a client user's terminal used by said client user; and
   transmit to the mobile object a second operation command instructing the mobile object to transport said client user aboard the mobile object to said medical facility as a second destination in response to deciding to transport said client user to said medical facility after said mobile object moves to said first destination,
   wherein in cases where there are a plurality of medical facilities, said controller is further configured to select a medical facility as said second destination according to the result of the medical examination of said client user.

* * * * *